(12) United States Patent
Stocco et al.

(10) Patent No.: US 12,077,361 B2
(45) Date of Patent: Sep. 3, 2024

(54) PACKAGING DEVICE FOR EYEWEAR FRAMES, KIT FOR THE PACKAGING OF EYEWEAR FRAMES AND PACKAGING METHOD OF AN EYEWEAR FRAME

(71) Applicant: KERING EYEWEAR S.P.A., Padua (IT)

(72) Inventors: Mauro Stocco, Padua (IT); Paolo Masiero, Padua (IT)

(73) Assignee: KERING EYEWEAR S.P.A., Padua (IT)

( * ) Notice: Subject to any disclaimer, the term of this patent is extended or adjusted under 35 U.S.C. 154(b) by 72 days.

(21) Appl. No.: 18/069,894

(22) Filed: Dec. 21, 2022

(65) Prior Publication Data
US 2023/0192386 A1     Jun. 22, 2023

(30) Foreign Application Priority Data
Dec. 22, 2021   (IT) .......................... 102021000032168

(51) Int. Cl.
*G02C 11/00*  (2006.01)
*A45C 11/04*  (2006.01)
(Continued)

(52) U.S. Cl.
CPC ............ *B65D 81/113* (2013.01); *A45C 11/04* (2013.01); *A45C 13/02* (2013.01); *A45C 2013/026* (2013.01)

(58) Field of Classification Search
CPC ... A45C 11/04; A45C 13/02; A45C 2013/026; A47F 7/021; B65D 81/113; G02C 3/04;
(Continued)

(56) References Cited

U.S. PATENT DOCUMENTS

| 2,467,251 A | * | 4/1949 | Bowman | B60R 7/082 248/205.5 |
| 2,493,503 A | * | 1/1950 | Renne | D06F 55/00 24/555 |

(Continued)

FOREIGN PATENT DOCUMENTS

| EP | 0282460 A2 | 9/1988 |
| JP | 2016-043854 A | 4/2016 |

OTHER PUBLICATIONS

Search Report for Italian Patent Application No. 102021000032168 (Jun. 22, 2022).

*Primary Examiner* — Gideon R Weinerth
(74) *Attorney, Agent, or Firm* — Merchant & Gould P.C.

(57) ABSTRACT

A packaging device for eyewear frames has a structure for supporting lenses. The device has a first and a second lateral temple, including a body, having a front abutment wall, configured to abut against an inner side of the structure of the frame. A rear wall is opposite the front abutment wall relative to a longitudinal direction, to abut the second lateral temple in a folded configuration towards the frame. A transverse notch extends along a transverse direction, perpendicular to the longitudinal direction, and passing through the body. The transverse notch partially extends between a pair of lateral walls of the body, from an open insertion end, which emerges onto a pair of the lateral walls, at a closed bottom end. The body includes a hole passing through the body, between the transverse notch and the front abutment wall, positioned to substantially align with the closed bottom end.

19 Claims, 4 Drawing Sheets

(51) Int. Cl.
*A45C 13/02* (2006.01)
*B65D 81/113* (2006.01)
*G02C 13/00* (2006.01)

(58) Field of Classification Search
CPC . G02C 3/00; G02C 5/00; G02C 5/001; G02C 11/00; G02C 13/00; Y10S 248/902; Y10T 24/155; Y10T 24/1371; Y10T 24/1385; Y10T 24/1324; Y10T 24/344; Y10T 24/3443; Y10T 24/44376
USPC ......... 24/3.3, 3.8, 30.5 R, 30.5 S, 336, 3.12, 24/563, 130, 198, 570, 561, 545, 546; 206/5; 211/85.1, 89.01, 41.1; 248/902, 248/316.7, 74.2, 309.1; 351/155, 41, 52, 351/158; D3/266, 263, 219
See application file for complete search history.

(56) References Cited

U.S. PATENT DOCUMENTS

| | | | | |
|---|---|---|---|---|
| 2,668,338 A * | 2/1954 | Harrison | ............ | A47G 25/1478 24/561 |
| 2,825,952 A * | 3/1958 | Van Driel | ............... | D06F 55/00 24/570 |
| 3,076,242 A * | 2/1963 | Priolo | ..................... | D06F 55/00 24/563 |
| 3,333,309 A * | 8/1967 | Wistinghausen | ...... | B65H 75/08 24/563 |
| 4,083,523 A * | 4/1978 | Fisher | ....................... | F16L 3/13 248/74.3 |
| 4,401,209 A * | 8/1983 | Salmond | ................ | A45C 11/04 206/349 |
| 4,440,374 A * | 4/1984 | Achille | ..................... | F16B 2/22 248/74.2 |
| D298,436 S * | 11/1988 | Pralutsky | ........................ | D3/266 |
| 4,930,740 A * | 6/1990 | Vogt | .......................... | B62J 11/00 24/17 AP |
| 5,082,225 A * | 1/1992 | Nespoli | .................... | B60R 7/082 248/902 |
| 5,137,242 A | 8/1992 | Reath | | |
| 5,592,244 A | 1/1997 | Vyhmeister | | |
| 5,645,252 A * | 7/1997 | Fisher | ....................... | F16L 3/22 24/297 |
| 5,653,414 A * | 8/1997 | Chimel | ................... | G02C 11/00 248/902 |
| 5,975,476 A * | 11/1999 | Mancinelli | .............. | B60R 7/082 248/902 |
| D423,777 S * | 5/2000 | Folisi | ............................. | D3/266 |
| D471,709 S * | 3/2003 | Coyne | ........................... | D3/266 |
| D618,958 S * | 7/2010 | Di Lollo | ........................ | D7/388 |
| 8,091,845 B2 * | 1/2012 | Di Lollo | ....................... | A47J 47/16 248/176.1 |
| 8,381,359 B1 * | 2/2013 | McArdle | ................... | A45F 5/02 24/3.12 |
| 10,582,794 B1 * | 3/2020 | Ekkert | .................... | A47G 29/00 |
| D1,002,342 S * | 10/2023 | Isler | .............................. | D30/153 |
| 2003/0229971 A1 * | 12/2003 | Coyne | ....................... | A45F 5/02 24/3.3 |
| 2013/0110164 A1 * | 5/2013 | Milazzo | ............. | A61B 17/0487 606/232 |
| 2014/0317886 A1 * | 10/2014 | Shwartz | .................. | A45F 5/00 24/3.3 |
| 2021/0157173 A1 * | 5/2021 | Masiero | ................. | G02C 11/00 |
| 2023/0192386 A1 * | 6/2023 | Stocco | .................. | B65D 85/54 206/5 |

* cited by examiner

PACKAGING DEVICE FOR EYEWEAR FRAMES, KIT FOR THE PACKAGING OF EYEWEAR FRAMES AND PACKAGING METHOD OF AN EYEWEAR FRAME

CROSS-REFERENCE TO RELATED APPLICATION

This application claims benefit of Application No. 102021000032168, filed 22 Dec. 2021 in Italy, and which application is incorporated herein by reference. To the extent appropriate, a claim of priority to made to the above-disclosed application.

FIELD OF APPLICATION

The present invention relates to a packaging device for eyewear frames, particularly suitable for being applied to frames at all stages following the production of the frames, which comprise packaging, transport and storage up to the final point of sale. The present invention relates to an eyewear frame packaging kit and also to a packaging method of an eyewear frame.

PRIOR ART

As is known, eyewear frames, in particular but not exclusively frames made of cellulose acetate, are subject to a highly recurring defect called "registration loss" with the consequent effect of "temple unbalancing".

Such a defect consists in the permanent or semi-permanent deformation of eyewear, i.e. a deviation involving the fact that the two temples of the eyewear have different orientations in space; in other words, there could be cases where the temples are not perfectly symmetrical in relation to a center plane of the frame such that the two terminal ends of the temples, when the temples are opened, do not rest mirrored upon a support plane, but at least one of said ends is raised in relation to the plane, or also cases where, notwithstanding that the two terminal ends of the temples rest upon a support plane, they are asymmetrical in relation to a center plane of the frame.

When said registration loss exceeds a certain tolerance, the defect results in incorrectly fitting eyewear, resulting in poor comfort for the end user or unusable eyewear.

Furthermore, the defect may be a reason for rejection by the user, who considers the frame to be defective and/or of poor quality.

The registration loss may be due to the material of the frame, the geometric-structural configuration thereof and, above all, the packaging of the frame after the manufacture thereof.

In particular, at the end of the production process, the frame is in fact perfectly symmetrical; the registration loss occurs subsequently, i.e. when the temples are completely folded such that the frame may be packaged and transported to the point of storage/sale.

It is known to package the frame in pouches made of plastics/other materials and possibly in a case made of a rigid or soft material.

The step of closing the temples is particularly critical.

In fact, at the moment of the closure of the temples, preceding the insertion of the frame into the bag or pouch, the first folded temple is in direct contact with the front portion of the structure of the frame. The point or region of contact between said first folded temple and the structure usually affects the end portion of the temple that abuts against a lateral portion of the structure with respect to the lens retained by the latter.

The first folded temple is interposed between the front structure and the second folded temple which does not therefore abut against the structure itself. Thus, the second folded temple may not assume the same position as the first temple, and the mount shows a first asymmetrical configuration. In reopening the frame, the two temples resume (at least initially) the respective positions thereof on the two sides of the frame, resulting theoretically in being symmetrical and with mirrored orientations therebetween.

When the frame, in a folded configuration, is inserted into a bag, pouch or similar packaging means, asymmetric stresses are frequently induced in the frame of the eyewear, which are further amplified if the container in which the frame is inserted has a reduced volume, so as to compress the frame therein.

Asymmetric stresses tend to stress the temples towards the upper portion of the frame as well as warping the frame itself.

This warping induces plastic deformations, i.e. irreversible deformations, which remain also after the frame has been removed from the package and the relative temples have been opened in order to be able to wear the eyewear.

The occurrence of plastic or irreversible deformations occurs mainly, but not exclusively, with frames made of polymeric materials and is further amplified by the duration and the temperature/humidity of the storage environment of the frame in the folded temple configuration.

There are some solutions in the prior art to overcome such drawbacks.

For example, larger cases or packages may be provided, which prevent the compression of the folded temples against the frame.

These solutions, however, entail disadvantages in terms of weight and dimensions; furthermore, they do not prevent the temples from being accidentally compressed during transport, warped in the case of shocks/crushing or influenced by temperature and humidity conditions.

Also known are solutions using spacers that are interposed between the structure and the first temple, as well as between the temples themselves. These solutions are not however securely attached to the frame and may easily move during transport; moreover, they are not able to effectively and uniformly discharge the compression forces from the temples onto the frame.

Furthermore, these solutions, as a result of use, may easily break insofar as they tend to spread apart in order to be fitted onto the temples.

Finally, the known spacers have aesthetic and/or perceived limitations in construction quality, such that they are somewhat coarse.

This is commercially incompatible with the possible use of a spacer in the packaging of high-end eyewear.

DISCLOSURE OF THE INVENTION

The need to solve the drawbacks and limitations mentioned with reference to the prior art is therefore felt.

This need is met by a packaging device for eyewear frames, by a packaging kit, and by a packaging method.

DESCRIPTION OF THE DRAWINGS

Further features and advantages of the invention will become more apparent from the following detailed description of preferred, non-limiting embodiments thereof, wherein.

Figure 1:
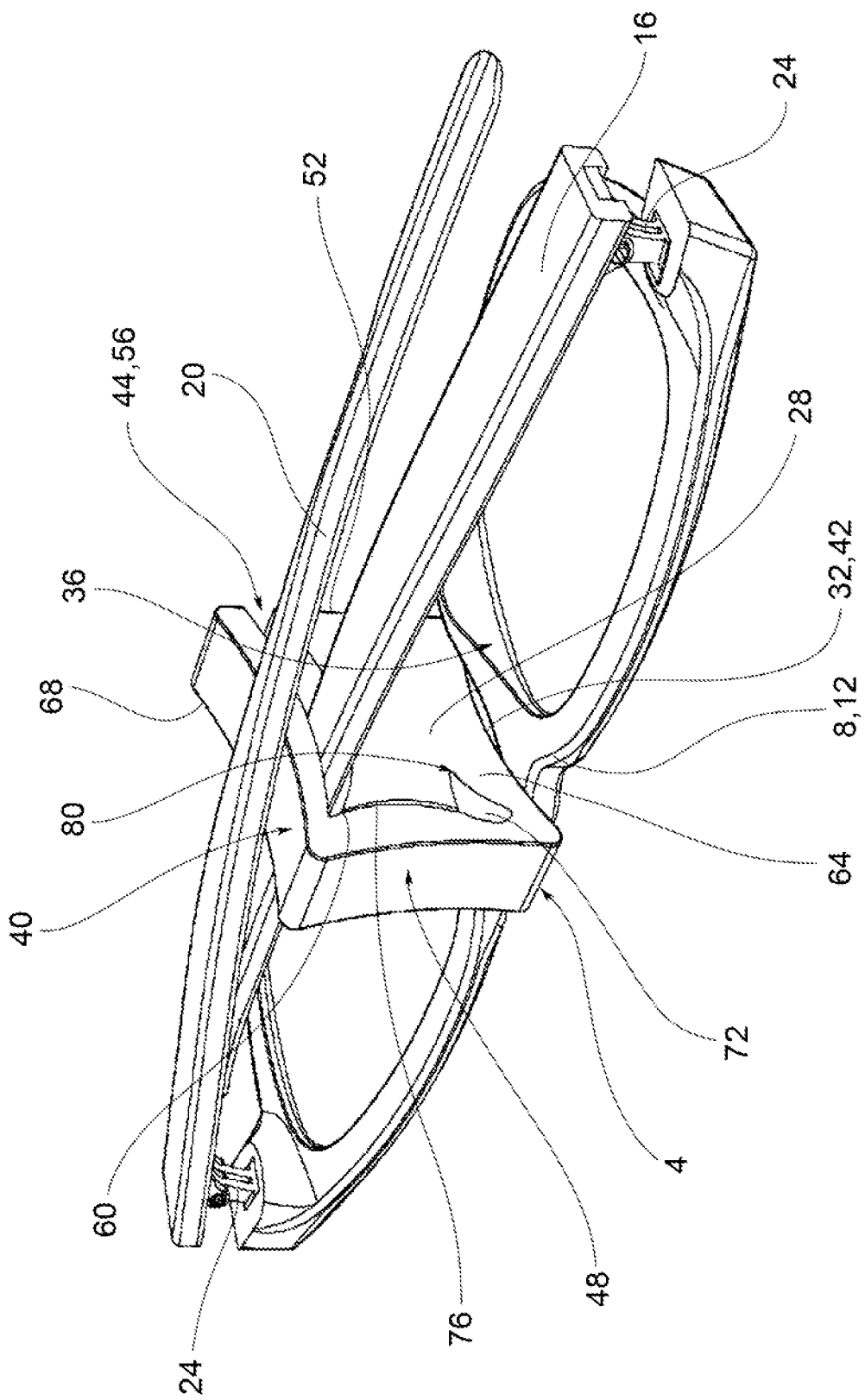
FIG. 1-2 are perspective views, from different angles, of an eyewear frame packaged by a packaging device according to one embodiment of the present invention.

Elements or parts of elements common to the embodiments described hereinafter will be indicated with the same numerical references.

DETAILED DESCRIPTION

With reference to the aforesaid figures, an overall schematic view of a packaging device for eyewear frames 8 according to the present invention has been indicated collectively with 4.

The eyewear frames 8, in a known manner, have a structure 12 suitable for supporting lenses and provided with a first and a second lateral temple 16, 20 which is foldable in relation to the structure 12, typically by special hinges 24.

The packaging device 4 comprises a body 28, deformable and parallelepiped-shaped, having a front abutment wall 32 configured to abut against an inner side 36 of said structure 12 of the frame 8.

The body 28 further comprises a rear wall 40, opposite the front abutment wall 32 with respect to a longitudinal direction X-X, suitable for abuttingly receiving the second lateral temple 20 in a folded configuration towards the structure 12, as better described below.

In accordance with a possible embodiment, the front abutment wall 32 has a recess or concave portion 42 towards the associable frame 8.

Preferably, but not necessarily, the rear wall 40 has a flat profile.

The body 28 further comprises a transverse notch 44, directed along a transverse direction Y-Y, perpendicular to said longitudinal direction X-X, and passing through a thickness S-S of the body 28.

For example, said transverse notch 44 has a width of 0.5 mm.

The transverse notch 44 extends partially between a pair of lateral walls 48, 52 of the body 28, from an open insertion end 56, which emerges onto one of said lateral walls 52, to a closed bottom end 60 spaced from the opposite lateral wall 48.

Said transverse notch 44 at least partially divides the body 28 into a front portion 64, which interfaces abutting against the structure 12, and a rear portion 68 intended to interpose between the first lateral temple 16 and the second lateral temple 20, as better described below.

Advantageously, the body 28 comprises at least one hole 72 passing through said thickness S-S, arranged between the transverse notch 44 and the front abutment wall 32, in a substantially aligned position with said closed bottom end 60.

In accordance with a possible embodiment, said through hole 72 is seamlessly connected to the transverse notch 44 by a longitudinal notch 76.

In accordance with a possible embodiment, said longitudinal notch 76 is substantially parallel to the longitudinal direction X-X.

For example, said longitudinal notch 76 has a width of 0.5 mm.

In accordance with a possible embodiment, said longitudinal notch 76 is positioned between the lateral walls 48, 52 in a misaligned position in relation to a center plane M-M of the body 28, according to a transverse misalignment D.

Preferably, said transverse misalignment D is at least equal to ½ of the distance between the center plane M-M and the corresponding lateral wall 48, 52.

In accordance with a possible embodiment, said through hole 72 has a tapered portion 80, facing the open insertion end 56, and a rounded portion 84 on the side opposite the open insertion end 56.

In accordance with a possible embodiment, said tapered portion 80 has a 'V' configuration.

The combined use of the tapered portion 80 and the rounded portion 84 makes it possible to obtain a particular deformation of the body 28 when applied to the frame 8. In fact, the insertion of the first lateral temple 16 inside the transverse notch 44 causes a retraction of the rear portion 68 of the body 28 in relation to the front portion 64. Said retraction is facilitated by the notching effect provided by the tapered portion 80, while the rounded portion 34 provides greater resistance to deformation.

In accordance with a possible embodiment, the body 28 is made of EPDM (ethylene propylene diene rubber). This material is particularly suitable for the purpose of allowing effective packaging of the frame 8 insofar as it is capable of providing adaptation, by elastic deformation, to the various geometries and dimensions of the frames 8, avoiding the transmission of excessive loads to the structure 12, thereby preventing deformation of the structure 12 and/or of the lateral temples 16, 20.

Preferably, the body 28 has a hardness of between 5 and 15 Shore A, preferably between 8 and 12 Shore A. It has been possible to verify that the hardness ranges indicated above allow for the best adaptation of the packaging device 4 to the different geometries and dimensions of the frames 8, so as to avoid the transmission of excessive loads to the structure 12 and/or to the lateral temples 16, 20.

According to a possible embodiment, said body 28 is elastically deformable.

It is also possible to provide embodiments in which said body 28 is deformable at least partially plastically. Obviously, in the event of plastic deformations, i.e. permanent deformations, the packaging device 4 cannot reasonably be reused. In any case, it should be noted that localized plastic deformations of the packaging device 4 may be useful in order to obtain a better and more uniform distribution of loads in order to avoid possible deformations of the structure 12 and/or of the lateral temples 16, 20.

According to one possible embodiment, the body 28 has a thickness of between 5 and 15 mm, preferably between 8 and 12 mm.

The present invention also relates to an eyewear frame 8 packaging kit comprising a packaging device 4, as described above, and at least one case or wrapper (not shown) for said frame 8.

The operation and method for using a packaging device for eyewear frames according to the present invention will now be described.

In particular, the packaging method of an eyewear frame 8 comprising the steps of arranging a pair of glasses having a frame 8, a first lateral temple 16 and a second lateral temple 20, arranged in an initial opening configuration.

The term initial opening configuration means that said first and second lateral temples 16, 20 are initially in a substantially perpendicular configuration in relation to the structure 12; in other words, the initial opening configuration corresponds to the configuration in which the user wears the glasses. Preferably, but not exclusively, in this step the eyewear is placed on a surface, so as to facilitate the packaging step.

The method then proceeds by applying the packaging device 4 described above so as to fork the first lateral temple 16 from the side of the open insertion end 56 until it reaches the contact between the first lateral temple 16 and the closed bottom end 60. It should be noted that such contact between the first lateral temple 16 and the closed bottom end 60 is not indispensable; therefore, the stop may also not occur. In this step, there is a clear separation or retraction of the rear portion 68 in relation to the front portion 64 of the body 28. As mentioned above, this retraction is facilitated by the particular shape of the hole 72; in other words, the rear portion 68 tends to pivot, retracting from the tapered portion 80 of the hole 72.

The method then proceeds with the step of folding said first lateral temple 16 towards the frame 12 until the front abutment wall 32 abuts against the structure 12.

This step is particularly delicate since the contact takes place between the front portion 64 of the body 28 and the frame 8. The presence of the recess or concave portion 42 on the front abutment wall 32 favors the adaptation of the body 28 to the geometry of the frame 8.

Figure 2:
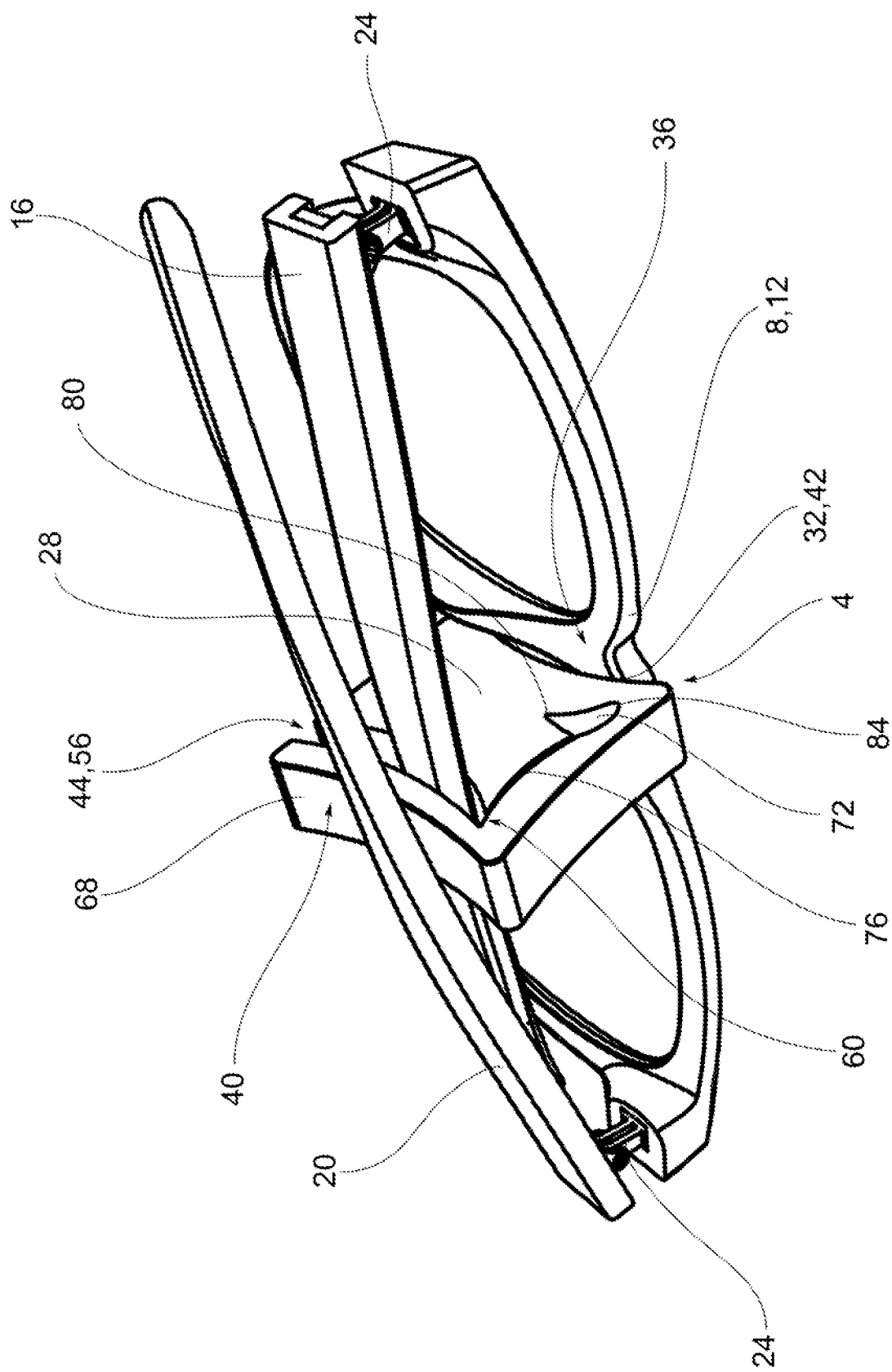
Figure 3:
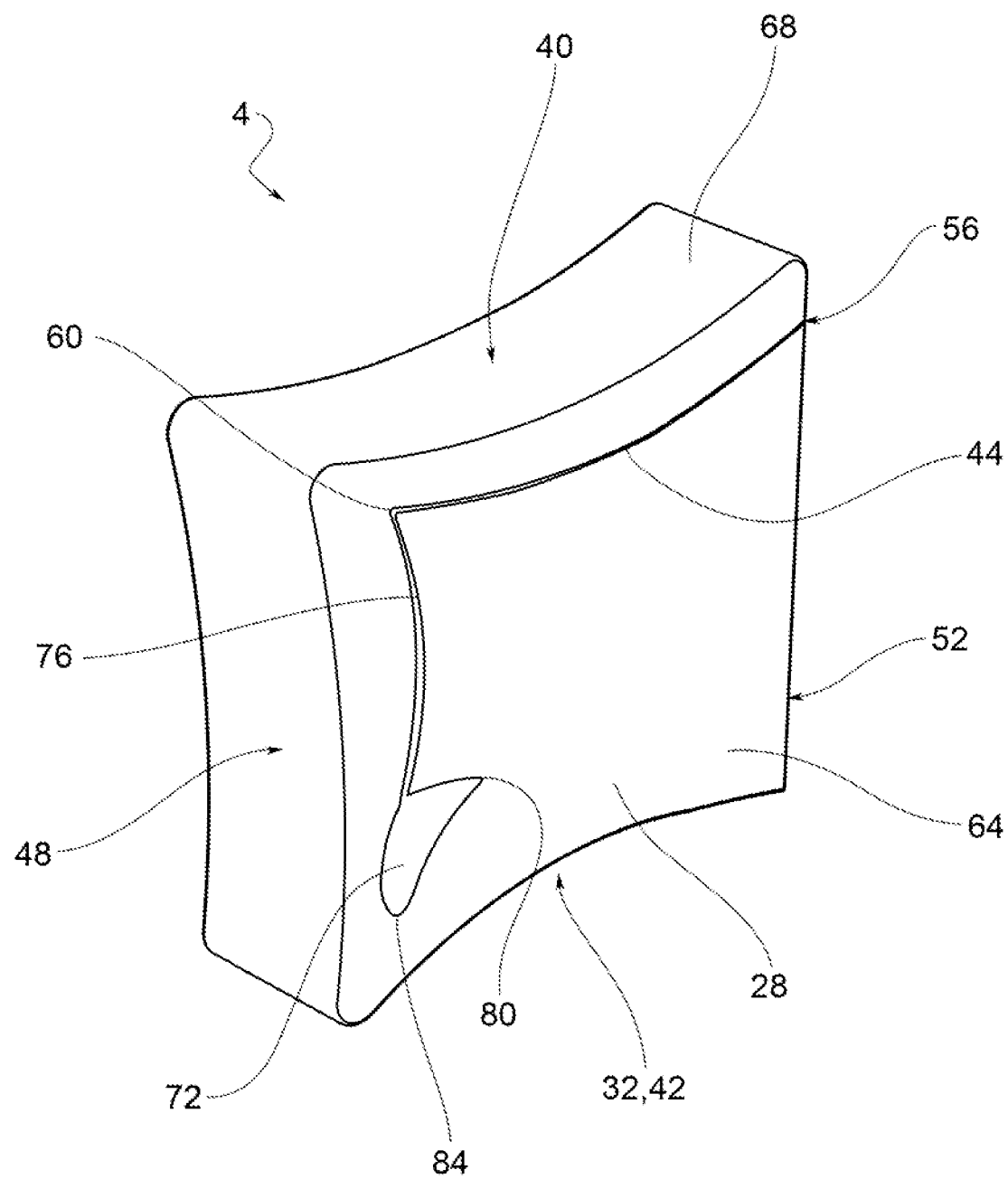
FIG. 3 depicts a perspective view of the packaging device applied to the eyewear frame shown in FIG. 1-2, in a deformed configuration.
Figure 4:
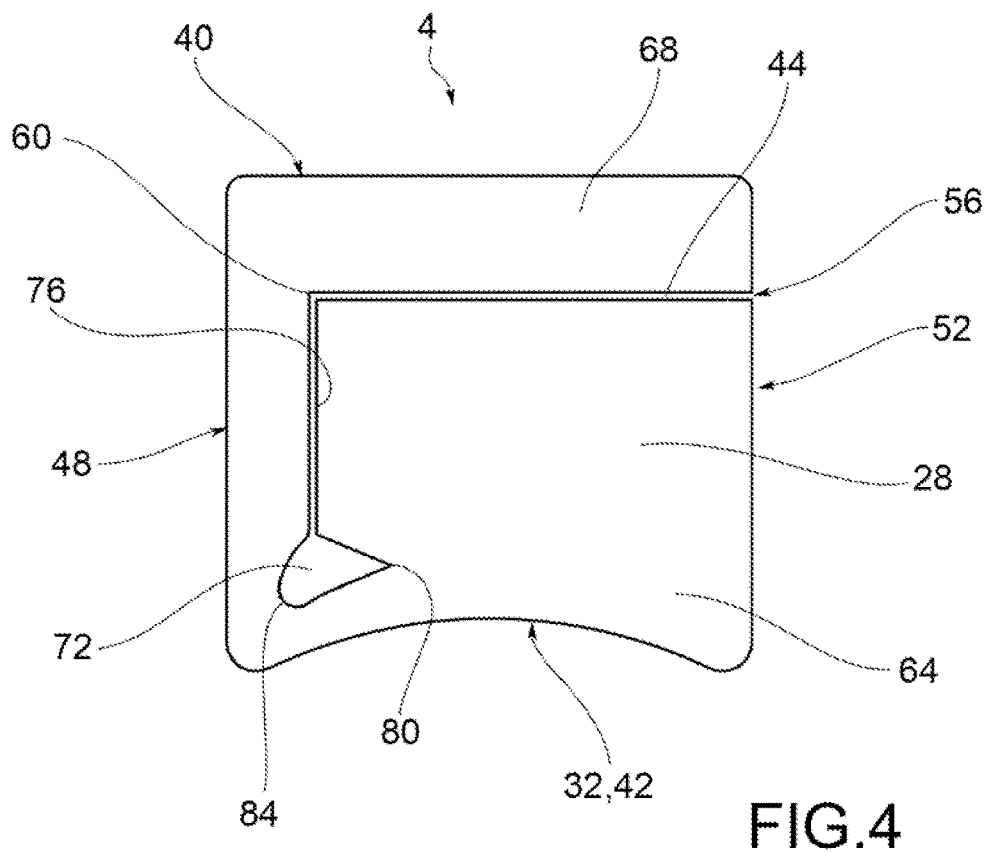
FIG. 4-5 show front views of packaging devices of different sizes, according to possible embodiments of the present invention.
Figure 5:
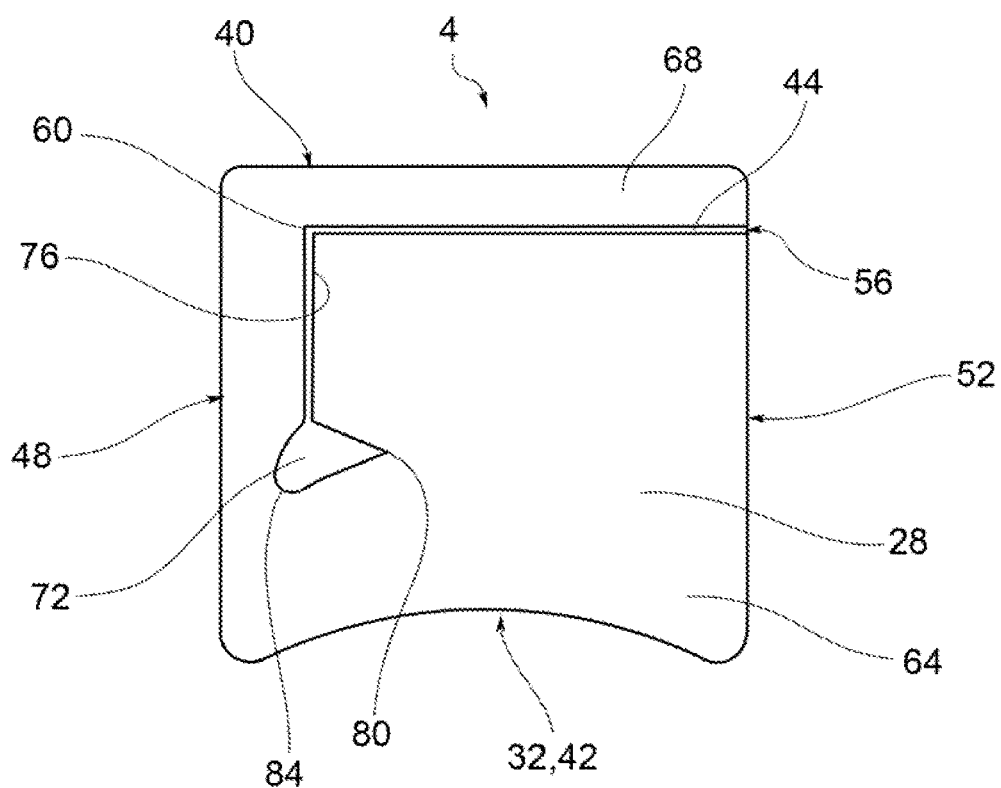

Finally, the method proceeds with the step of folding the second lateral temple 20 until it abuts against the rear wall 40 of the body 28. In this way, the rear portion 63 is interposed between the first lateral temple 16 and the second lateral temple 20. It should be noted that the compression of the rear wall 40 by the second lateral temple 20 results in a concave configuration (FIG. 1-3) with which the packaging device 4 adapts perfectly to said lateral temples 16, 20.

Furthermore, the compression of the second lateral temple 20 is also transmitted, by the rear portion 68 of the body 28, to the first lateral temple 16, which in turn pushes towards the front portion 64.

In fact, the front portion 64, from the side of the first lateral temple 16, deforms, assuming in turn a concave configuration parallel to the concavity of the rear wall 40. These deformations of the body 28 constitute an adaptation thereof to the pressure received from the closure of the first and second lateral temples 16, 20; as seen, the hole 72 allows for an adequate discharge of such pressure, avoiding excessive stresses upon the structure 12. In other words, the body 28 constitutes a highly deformable element that deforms as much as possible under the loads transmitted by the lateral temples 16, 20, avoiding the transmission of such stresses directly and exclusively onto the structure 12 of the frame 8.

The synergy between the geometry of the body 28 and the hole 72 makes it possible to preserve the structure 12 as much as possible.

As may be appreciated from that described, the present invention overcomes the drawbacks of the prior art.

In particular, the present invention, thanks to the through hole, makes it possible to discharge the pressure exerted by the closure of the second temple so as to not over-stress the frame.

The packaging device, by virtue of the geometric conformation thereof, deforms so as to allow for a more uniform distribution of loads onto the frame, thereby preventing it from being irreversibly distorted.

The packaging device, as seen, adapts to the geometries of the frame, deforming appropriately so as to accommodate the closure of the lateral temples onto the frame without inducing excessive or unbalanced loads onto the latter.

Thus, the present invention makes it possible to avoid or limit the phenomenon of registration loss.

It is therefore possible to store and transport frames, with the temples folded, without them becoming warped or at least significantly reducing the risk thereof.

A person skilled in the art, for the purpose of satisfying contingent and specific needs, may make numerous modifications and variations to the solutions described above.

The scope of protection of the invention is defined by the following claims.

The invention claimed is:

1. A packaging device for eyewear frames having a structure adapted to support lenses and provided with a first lateral temple and a second lateral temple which is foldable with respect to the structure; comprising:
   a body, deformable and parallelepiped-shaped, having a front abutment wall, configured to abut against an inner side of said structure of the frame;
   a rear wall, opposite the front abutment wall with respect to a longitudinal direction, adapted to abuttingly receive the second lateral temple in a folded configuration towards the structure;
   a transverse notch, directed along a transverse direction, perpendicular to said longitudinal direction, and passing through a thickness of the body;
   wherein the transverse notch extends partially between a pair of lateral walls of the body, from an open insertion end, which opens on one of said lateral walls, to a closed bottom end spaced from the opposite lateral wall;
   wherein the body comprises at least one through hole passing through said thickness, arranged between the transverse notch and the front abutment wall, in a substantially aligned position with said closed bottom end.

2. The packaging device for eyewear frames according to claim 1, wherein said through hole is seamlessly connected to the transverse notch by a longitudinal notch.

3. The packaging device for eyewear frames according to claim 2, wherein said longitudinal notch is substantially parallel to the longitudinal direction.

4. The packaging device for eyewear frames according to claim 2, wherein said longitudinal notch is positioned between the lateral walls in a misaligned position with respect to a center-plane of the body, according to a transverse misalignment.

5. The packaging device for eyewear frames according to claim 4, wherein said transverse misalignment is at least equal to one-half of a distance between the center-plane (M-M) and the corresponding lateral wall.

6. The packaging device for eyewear frames according to claim 1, wherein said through hole has a tapered portion, facing the open insertion end, and a rounded portion on a side opposite the open insertion end.

7. The packaging device for eyewear frames according to claim 6, wherein said tapered portion has a "V"-shape.

8. The packaging device for eyewear frames according to claim 1, wherein the front abutment wall has a recess or concave portion towards the associable frame.

9. The packaging device for eyewear frames according to claim 1, wherein the rear wall has a flat profile.

10. The packaging device for eyewear frames according to claim 1, wherein the body is made of EPDM.

11. The packaging device for eyewear frames according to claim 1, wherein the body has a hardness between 5 and 15 Shore A.

12. The packaging device for eyewear frames according to claim 1, wherein said body is elastically deformable.

13. The packaging device for eyewear frames according to claim 1, wherein said body is at least partially plastically deformable.

14. The packaging device for eyewear frames according to claim 1, wherein the body has a thickness between 5 and 15 mm.

15. The packaging device for eyewear frames according to claim 1, wherein said longitudinal notch and/or said transverse notch has a width of 0.5 mm.

16. An eyewear frame packaging kit comprising a packaging device according to claim 1 and a case or casing for said frame.

17. A packaging method of an eyewear frame comprising the steps of:

arranging a pair of glasses having a frame, a first and a second lateral temple, arranged in initial opening configuration;

applying a packaging device according to claim 1, to fork the first lateral temple from the side of the open insertion end until reaching a contact between the first lateral temple and the closed bottom end;

folding said first lateral temple towards the structure until the front abutment wall abuts against the structure;

folding the second lateral temple until the second lateral temple abuts against the rear wall of the body.

18. The packaging device for eyewear frames according to claim 1, wherein the body has a hardness between 8 and 12 Shore A.

19. The packaging device for eyewear frames according to claim 1, wherein the body has a thickness between 8 and 12 mm.

* * * * *